L. B. WHIPPLE.
LAST LATHE.
APPLICATION FILED APR. 13, 1916.
1,293,276.
Patented Feb. 4, 1919
5 SHEETS—SHEET 4.
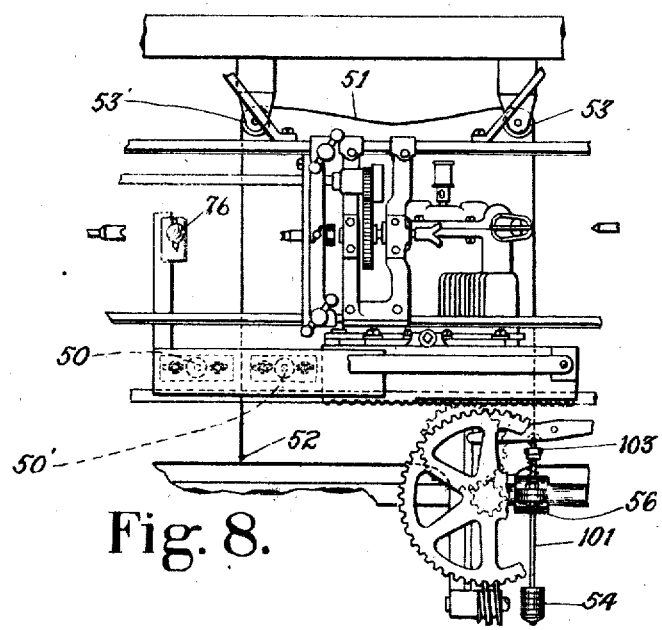
Fig. 8.
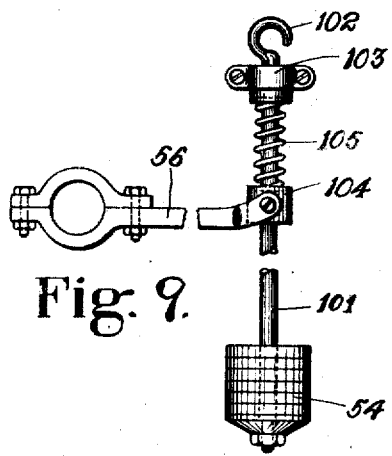
Fig. 9.  Fig. 10.
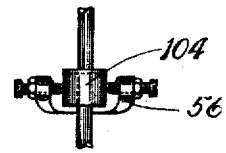
INVENTOR.

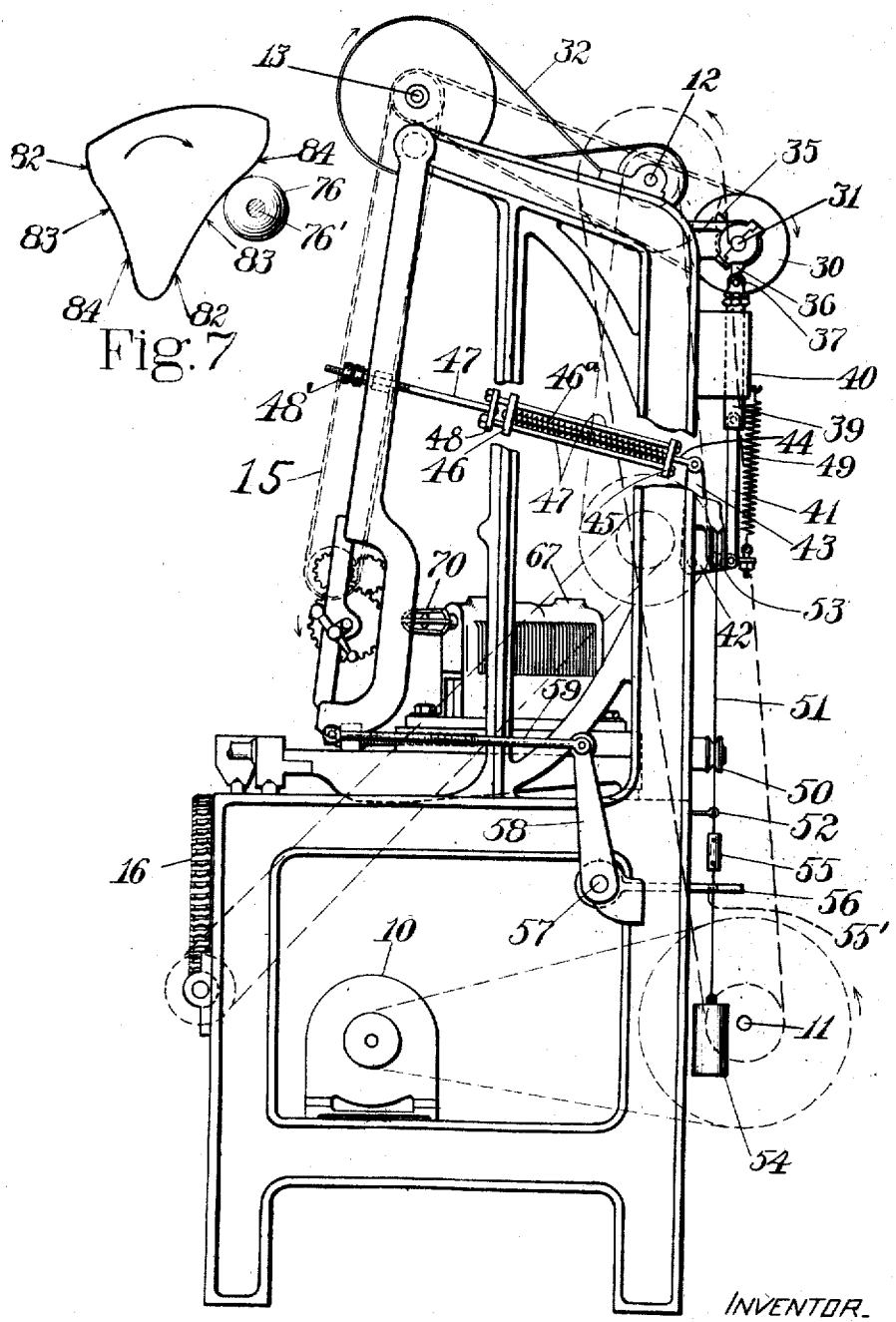

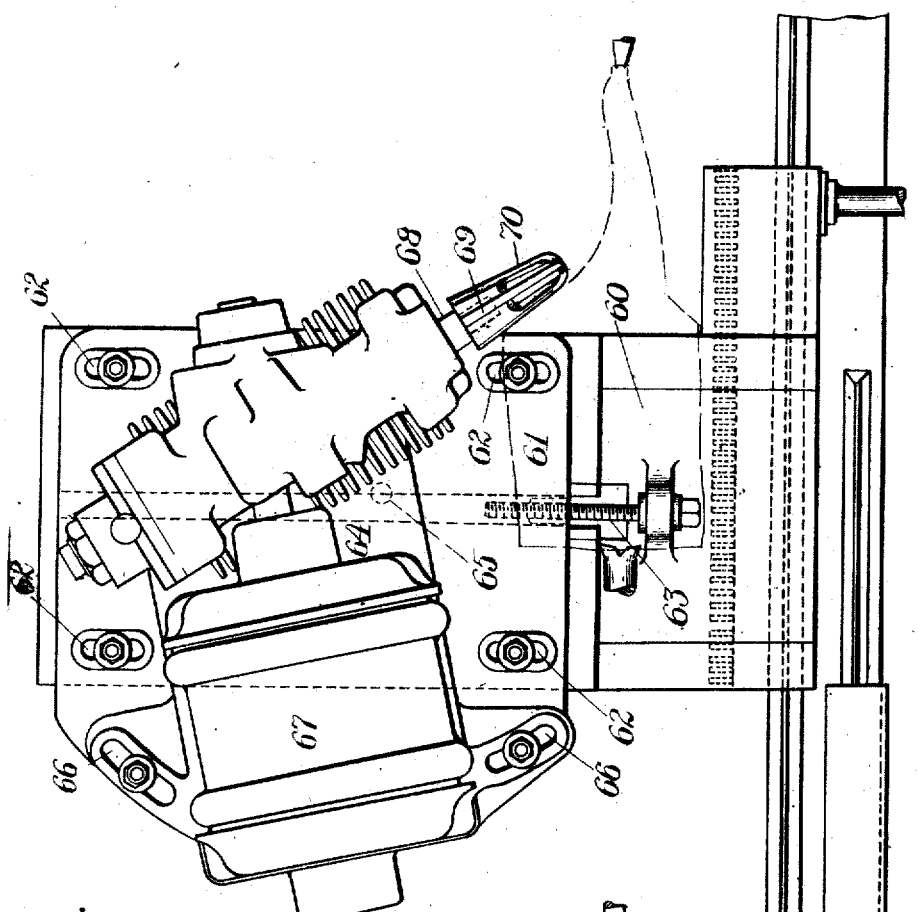

L. B. WHIPPLE.
LAST LATHE.
APPLICATION FILED APR. 13, 1916.
1,293,276.
Patented Feb. 4, 1919.
5 SHEETS—SHEET 5.
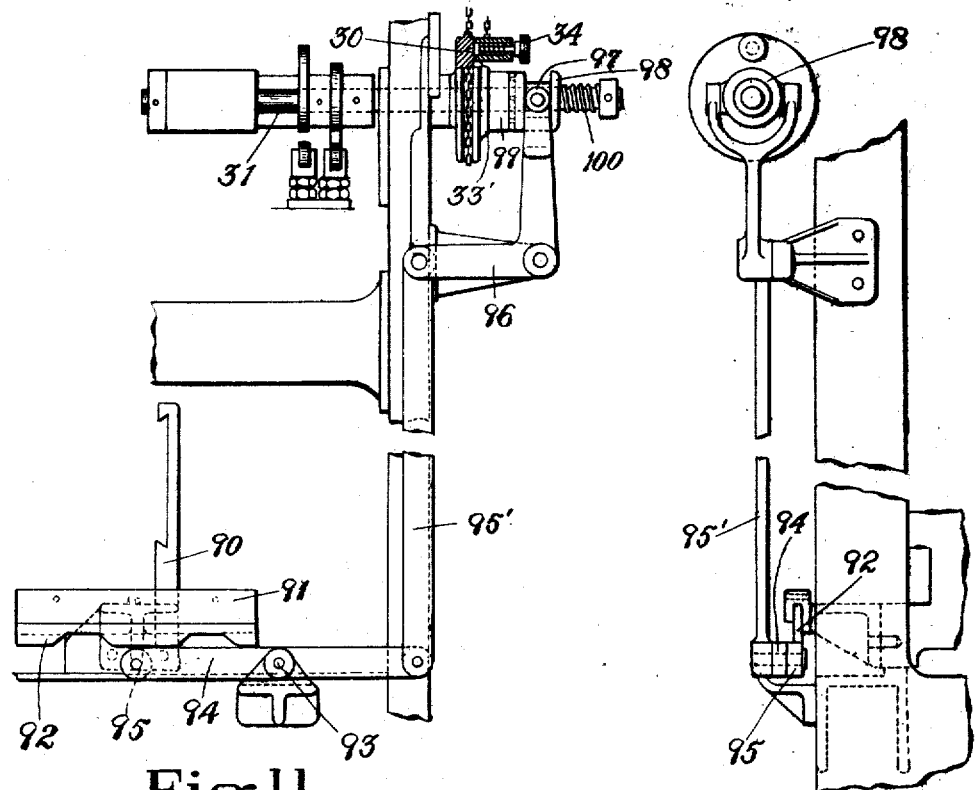
Fig. 11.
Fig. 12.
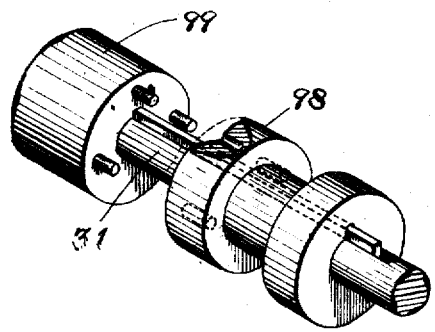
Fig. 13.
INVENTOR.
Leland B. Whipple
By his Attorney,

UNITED STATES PATENT OFFICE.

LELAND B. WHIPPLE, OF ROCHESTER, NEW YORK, ASSIGNOR TO FITZ-EMPIRE DOUBLE PIVOT LAST COMPANY, OF AUBURN, MAINE, A CORPORATION OF MAINE.

LAST-LATHE.

1,293,276.   Specification of Letters Patent.   Patented Feb. 4, 1919.

Application filed April 13, 1916.   Serial No. 90,878.

*To all whom it may concern:*

Be it known that I, LELAND B. WHIPPLE, a citizen of the United States, residing at Rochester, in the county of Monroe and State of New York, have invented certain Improvements in Last-Lathes, of which the following description, in connection with the accompanying drawings, is a specification, like reference characters on the drawings indicating like parts in the several figures.

My invention relates to lathes for turning irregular objects, and in particular to last lathes.

In the use of these machines great inconvenience has been experienced owing to the fact that the model wheel used, which is several inches in diameter, will not follow the more sharply curved depressions in the model, leaving much hand work to be done in surfacing the last after it leaves the lathe, and thus it has been difficult to obtain absolute correspondence between members of a pair, or between lasts of a size. It has been proposed to meet this difficulty by using a model wheel and cutter of small diameter but such attempts to solve the difficulty have heretofore proved unsuccessful.

One difficulty that arose lay in the failure to provide a cutter which, while corresponding to the small model wheel in size, would prove adequate to the removal of the great amount of waste material in a last block. Attempts were made to solve this difficulty by providing several independent tools for the roughing and finishing cuts, or by providing a single tool with several blades for roughing and finishing, respectively, but these devices failed to achieve success owing to their intricacy, expense of construction and liability to get out of adjustment.

Another difficulty was met with in the pressure mechanism. It has long been the practice to assist gravity in forcing the swing frame toward the model wheel and cutter, as it was found that gravity alone would not carry the deeper hollows up to the model wheel owing to the reaction between the cutter and the block the effective force exerted by gravity being small when the surface being cut is near the axis of rotation, as is the case in a hollow. The usual procedure has been to hang weights on a belt crank at the back of the machine, thus exerting a pull or pressure on the swing frame.

It was found when a small model wheel was used, that the cone of the last would lock over the small wheel instead of rolling over it, interfering seriously with the cutting by stopping or jerking the lathe, and it proved impossible to cure the difficulty by adjusting the pressure, since the least pressure that would carry the model wheel down into the hollows would stop the machine or jerk the swing frame badly when the cone turned over the model wheel.

It is the object of my invention to provide a lathe which shall reproduce accurately a model having deep hollows and a generally complicated contour and eliminate the difficulties described above.

A feature of my invention is a cutter having an effective diameter substantially less than the diameter of the instep portion of a model, whereby the sharply concaved portions of the model are accurately reproduced.

Another feature of my invention is a cutter with a combined roughing and finishing blade having a portion of sharp curvature, which, while capable of finishing the most sharply curved portions of lasts, shall be at the same time strong and not liable to get out of adjustment.

Another feature of my invention is a cutter carrier linearly and angularly adjustable with relation to the work and a cutter having its axis of rotation inclined to the axis of the work, whereby the cutter may be adjusted to the position best suited to the particular style of last being cut.

A further feature of my invention is a mechanism for creating a predetermined variable reaction between the model and the model wheel, so that the model wheel shall always be held with the requisite pressure in proper contact with the different parts of the model without loss of smoothness of action.

Another feature of my invention is a mechanism for causing a substantially constant pressure between the model and model wheel during a predetermined portion of the turning of a last, so that the more regular portions of the last can be turned to best advantage.

Other features of the invention, comprising certain arrangements and combinations of parts, will be described and claimed in the following specification.

I have shown my invention as embodied in a Gilman last lathe of otherwise ordinary construction, but it is in its broader aspects applicable to lathes of other types.

In the drawings which show a preferred embodiment of the invention,

Fig. 2 is a side elevation.

Fig. 3 is a plan view of the cutter and model mechanism,

Figs. 4 and 5 are detail views of the cutter.

Fig. 6 is a view of another form of cutter,

Fig. 7 is a diagrammatic view illustrating the relation of the model wheel to the model, Fig. 8 is a fragmentary elevation of a modified form of the lathe.

Figs. 9 and 10 are details thereof,

Figs. 11 and 12 are rear and end views respectively of a modified form of cam shaft drive, and Fig. 13 is a detail of a clutch.

Figure 1:
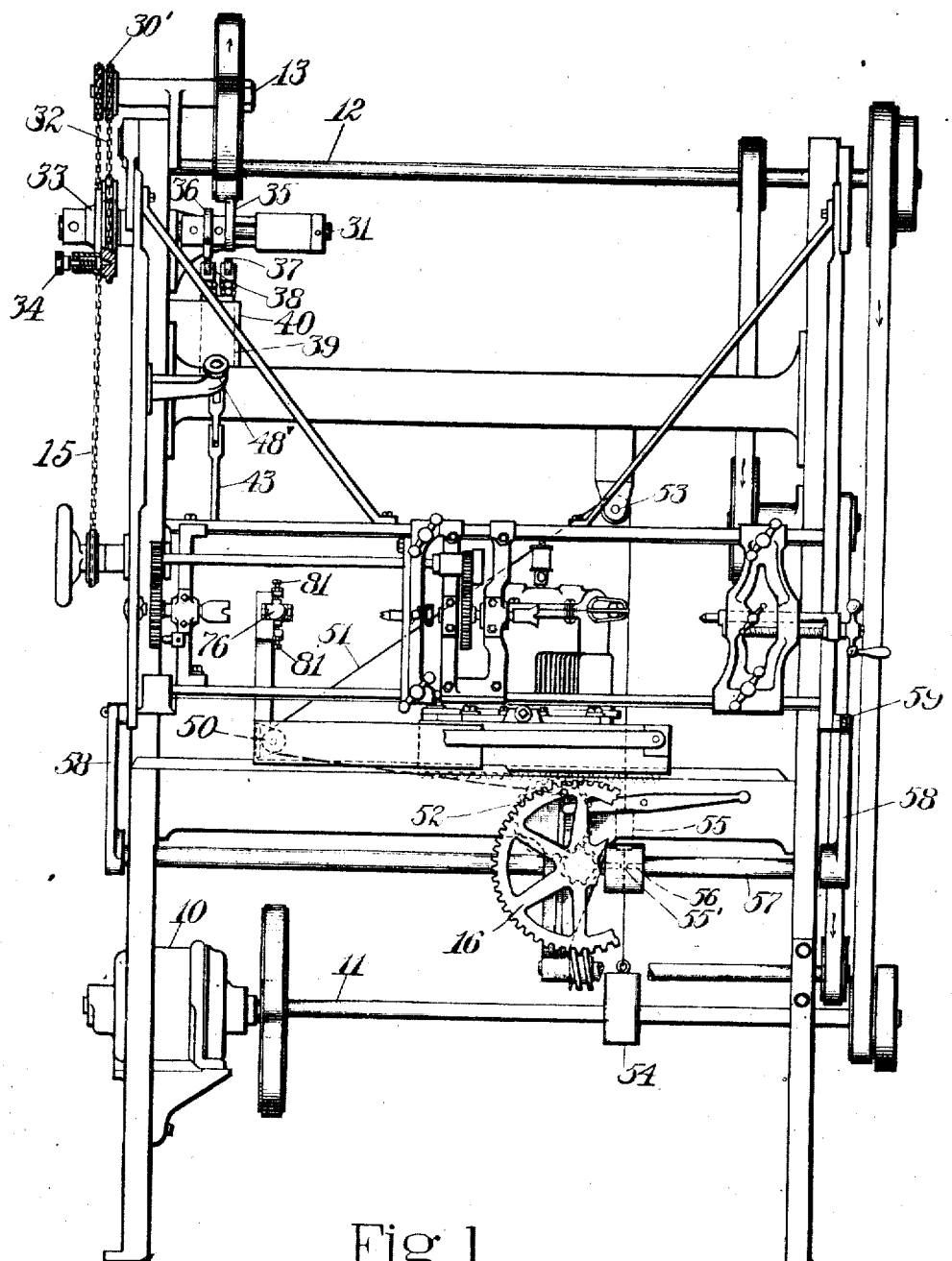
Figure 1 is a front elevation of the lathe.

The motor 10 drives the shaft 11 which is belted to the shaft 12. The shaft 12 drives the shaft 13 from which extends a sprocket chain 15 which drives the model and the block in the well known manner. The shaft 12 also drives the carriage traversing mechanism 16. All of the above mentioned structure is well known in the last turning art and need not be further described.

The sprocket 30 is loosely mounted on the stub shaft 31, and is driven by the chain 32, which is driven by the sprocket 30' on the shaft 13. The driving elements are so proportioned that the stub shaft 31 revolves at the same speed as the model and the work. The stub shaft 31 carries the integral disk 33 which is locked to the sprocket 30 by the spring-operated pin 34. The sprocket 30 has two holes, 180° apart, in either of which the pin 34 may engage. As will be described later, one position is used when turning a right last from a right model, and the other is used when turning a left last from a right model. The stub shaft 31 also carries two cams 35, 36 which in the lower parts of their paths, engage respectively, the two rolls 37, 38. These rolls are mounted at the upper end of a plunger 39, sliding in a guide 40 and having a link 41 at its lower end. This link is pivoted also to the horizontal arm 42 of the bell crank lever, the vertical arm 43 of which is pivoted to a rod 44. This rod slides freely through a plate 45 and is fastened to a plate 46. Two rods 47 are fastened at their rear ends to the plate 45, slide freely through the plate 46, and are fastened to a plate 48 at their forward ends. A spring 46ª is mounted on the rod 44 between the plates 45, 46, and the rod 47, by means of the nuts 48', is slidably and adjustably mounted in the swing frame so that the linkage 44—47 forms a resiliently extensible connection between the bell crank 43 and the swing frame. A spring 49 is attached to the guide 40 and to the link 41 in order to hold normally the slide 39 in its highest position.

The model wheel carriage which is moved through a length grading connection. not shown, carries a pulley 50. A cord 51 fastened to a pin 52 on the frame, passes around the pulley 50, and around a pulley 53 on the frame, and has a weight 54 suspended at its lower end. A clamp 55 is fastened to the cord 51. Below the clamp cord 51 passes through a hole 55' in an arm 56 on the rock shaft 57, having at its ends the arms 58, linked to the swing frame by the links 59.

The cutter carriage 60 carries a slide 61, adjustable back and forth by means of the slots and clamp bolts at 62 and the screw 63. Upon the slide 61 is a second slide 64 which is angularly adjustable about a pivot 65 by the slots and clamp bolts at 66. The slide 64 carries an electric motor 67, the shaft of which is geared to the cutter shaft 68, having the cutter 69 at its forward end. This cutter, (see Figs. 4 and 5) has four blades or cutting edges 70, straight and converging slowly for the greater portion of their length, and terminating in quadrantal portions 71 of a circle of about 1½ inches diameter. Two of these quadrantal portions 72, 73 are continuous over the nose of the cutter, but the other two have a slight discontinuity or clearance, as at 74, to facilitate the formation of the cutting edges 72, 73. The cutter is bored out twice at right angles as at 75 to prevent clogging by chips. Fig. 6 shows a similar two-bladed cutter. The model guide contact member is shown in the drawings as the model wheel 76, a spherical ball 1½ inches in diameter having two diametrically opposed conical depressions 76' (see Fig. 7) in which are seated balls resting in spherical seats in the ends of the arms 77, 78. These arms are integrally bolted together and mounted upon the pin 80. A small clearance 79 extends a portion of their length so that wear can be taken up. In this particular embodiment of the invention the pin 80 is the pin upon which the 10-inch model wheel usually furnished with this Gilman last lathe is mounted. The mounting 77, 78 is vertically adjustable upon this pin as an axis by means of two adjusting screws 81.

When a last is to be cut according to my invention the model and the block are mounted in the ordinary way on the swing frame. The cutter carriage 64 is so adjusted that the spherical nose of the cutter is in proper alinement with the model wheel 76 and so that the straight parts 70 of the cutting blades are at the proper angle. The rear end of the axis of the cutter will be inclined toward the heel portion of the block and the exact angle at which it is placed will depend upon the style of the last being cut. It will be obvious from an inspection of Fig. 3 that the straight portions 70 of the cutting blades do the roughing off of the block and that the finishing is done by the hemisperical nose of the cutter when it comes along later. It is obvious that the axis of the cutter must not tip so far toward the axis of the block that the roughing part of the blade near the base of the cutter will cut too deeply into the block. The first position in which the roughing portion of the blade 70 would become tangent to some portion of the instep of the last as the axis of the cutter is rotated toward the axis of the last will be the limiting position, since any further turning of the cutter will cause the roughing portion of the blade to "rob" this portion of the block.

It has before been proposed to incline the axis of the cutter with regard to the axis of the block but in those constructions in which the rear end of the axis of the cutter was inclined toward the toe of the block, the cutter was forced to under-cut or bore so that the roughing cutter chopped across the ends of the wood fibers. These constructions wasted a great deal of power and produced an inferior surface on the last. It has also been proposed to turn the axis of the cutter toward the heel part of the block, as I have done, but the cutter used in the proposed construction was not well adapted to the work to be performed, having separate roughing and finishing blades and being expensive and liable to get out of order. Furthermore, it was not capable of adaptation for use with a small model wheel, and was not therefore adapted to cut accurately a last having deep curves.

I have provided a cutter peculiarly adapted to work successfully with a small model wheel and to produce an excellent surface on the turned last. The roughing part of the blade is straight, is firmly supported at both ends and in view of the fact that it is continuous with the finishing portion of the blade, cannot possibly get out of adjustment therewith. The long straight roughing portion of the cutter, working at a convenient angle with the wood fibers, clears away the waste wood in advance of the portion of the block being finished so that the finishing part of the blade has very little wood to remove and is not in the least interfered with by the rough portions of the block. The cutter shown in the drawings is forged from a single piece of steel thus having great strength and rigidity. Its small diameter makes its moment of inertia per unit mass very small, as compared with cutters of already existing types, whereby extremely high rotational speed is permissible, and the quality of the work done is correspondingly improved.

My small model wheel and cutter have also solved another problem of long standing in the last turning art. It is of course obvious that in order to turn a smooth last on a lathe it is desirable to rotate the model and block so rapidly that the spiral track made by the cutter on the block will be of very short pitch and therefore not very deep. With the old style 10-inch cutter and model wheel it was found that high rotational speed of the model and block was not permissible. The 10-inch model wheel will not, of course, reach the bottoms of the more sharply curved depressions in the model and simply rolls from one "wall" to the other. This causes a serious bump or jar to the machine as the model wheel strikes the farther side of a depression. The violence of this jar increases with the rotational speed of the model since the model wheel and the projection on the model are brought together at a higher velocity. My small model wheel, on the other hand, rolls smoothly down into the depressions inasmuch as there is no depression on a last which has as small a radius of curvature as three quarters of an inch, and no percussive contact between the model wheel and the model occurs at any time. The swing frame comes to rest at its innermost position gradually instead of with a shock. The smoothness of operation of the machine is further enhanced by the construction of the swing frame. I have found that the heaviness and strength which were required in swing frames in lathes heretofore used are not necessary where my improved model wheel and cutter are used, in view of the absence of shocks and vibrations, and I have been able to obtain thoroughly satisfactory work by using a swing frame made of aluminum. The mass which is pushed outward by the model wheel is thereby greatly reduced and is concentrated largely at the elevation of the model wheel so that smoother action is obtained. It will therefore be seen that the rotational speed of the model and block can be substantially increased without jarring the lathe so that a much smoother last can be obtained.

Previous attempts to use a small model wheel and thus to reproduce more accurately the contour of the model in the last, were unsuccessful for still another reason. In cutting the hollow portions of a last the swing frame falls to a nearly vertical position. The force exerted by gravity in pressing it toward the model wheel and the cutter is correspondingly lessened and it was found that pressure additional to that exerted by gravity was necessary in order to effect proper contact between even the large model wheel and the model. This pressure was communicated by weights hung upon the arm 56. When it was attempted to use a small model wheel and cutter it was found that the least pressure which would carry the model wheel 76 from the portions 82 down into the hollows 83 (see Fig. 7) would cause the model to lock on the model wheel when the portions 84 were reached, either stopping or jerking the lathe. The cams 35 and 36 provide a means of avoiding this difficulty. They are so adjusted upon the stud shaft 31 that they press down the slide 29 and thereby exert pressure through the resilient link connection 44, 47, upon the swing frame just as the model wheel is rolling over the portions 82, 83 and release this pressure just as the model wheel is rolling over the portions 84. Thus pressure is applied to the swing frame at just the times when it is needed and is removed at times when it would be harmful.

I have found, however, that this intermittent pressure mechanism is not adapted to effect the proper cutting of the toe portion of the last. This portion of the last all lies comparatively close to the axis of rotation and it has been found that pressure in addition to that exerted by gravity on the swing frame is necessary during the complete rotation of the model and block while this portion of the last is being turned. I effect this uniform pressure by means of the weight 54. While the toe portion of the last is being cut the model wheel carriage is near the right hand extremity of its path in Fig. 1 and the cord 51 hangs slack, allowing the clamp 55 to rest upon the arm 56, thus transmitting the stress due to the weight 54 to the swing frame. As the cutting progresses the model wheel carriage moves to the left in Fig. 1 and the cord 51 is so adjusted that the slack in it is taken up at the time the instep is reached. Further progression of the model wheel carriage to the left in Fig. 1 lifts the weight through the pulleys 50 and 53 and raises the clamp 55 out of contact with the arm 56, whereupon the cutting proceeds under the action of the intermittent pressure mechanism alone.

In the construction shown this intermittent pressure mechanism acts conjointly with the weight 54 upon the swing frame as I have found that no untoward results are entailed by having the intermittent pressure mechanism operative over the toe portion of the block. It is within the scope of my invention, however, to confine the operation of this variable pressure mechanism to any desired portion of the cutting. Figs. 11, 12 and 13 show a modified form of lathe designed with this end in view.

The model wheel carriage 90 carries the pressure form 91 which may be formed of a thin metal bar having a cam 92. Fulcrumed at 93 upon the main frame of the lathe is a lever 94 which carries a roller 95 upon its inner end. The roller is so arranged as to engage the cam surface 92 as the moving model wheel carriage carries the pressure form 91 along. The outer end of the lever 94 is pivoted to the link 95' which at its upper end is pivoted to the bell crank 96 suitably mounted upon the main frame of the machine. The upper end of the bell crank 96 carries a collar 97 in which rotates one member 98 of a three-tooth clutch, the other member 99 of which is mounted upon the disk 33' which in this case is not integral with the cam shaft 31 but rotates freely upon it. The clutch member 98 is splined to the cam shaft 31 and it will be clear that when the clutch is engaged the sprocket wheel 30 will drive the disk 33' through the pin 34 and that the disk 33', through the clutch members 99 and 98, will drive the cam shaft 31. The clutch will be engaged whenever the roller 95 rises into one of the depressions in the pressure form 91 and such engagement is made positive by means of a spring 100. The pins of the three-tooth clutch are spaced 90 degrees apart so that the two clutch members can engage in only one relative position. This insures that the cam shaft 31 shall not get out of its proper relation to the model and the block. The low portions upon the pressure form 91 will disengage the clutch as they slide over the roller 95. It will thus be seen that the cam operated pressure mechanism may be placed in or out of action at any period of the cutting by a proper design of the pressure form 91.

It is also possible to so arrange the cord 51 and two take-up pulleys 50 and 50' (see Fig. 8) that the constant pressure mechanism will be brought into and put out of action at any desired time in order that the constant pressure portion of the cutting can be located arbitrarily at any point in the complete operation, as might be desirable in some kinds of irregular turning. One pulley 50 would be so located as to hold the cord stretched at the beginning of the operation, and to slacken it at the desired point, and the other pulley 50' would, as shown in the drawings, pick it up and tighten it at the desired point. The pulleys 50 and 50' are adjustably mounted on the model wheel carriage, and the cord 51 is led over an additional pulley 53', which may be made adjustable along its supporting arm. If desired, the mechanism of Figs. 11, 12 and 13 may be adapted to tighten and loosen the cord 51, so that the constant pressure mechanism may be put in or out of action whenever desired. It is not necessary to begin last cutting at the toe in order to take advantage of this feature of my invention.

Figs. 9 and 10 show a modification of the mechanism for suspending the weight 54. In this construction the weight is hung upon a rod 101 which is suspended from the cord 51 by the hook 102. The rod carries a fixed collar 103. The arm 56 has a collar 104 trunnioned at its end through which the rod 101 loosely passes. A spring 105 encircles the rod 101 between the collars 103 and 104. It is of course understood that the arm 56 is in continual up and down motion during the turning of a last and during that portion of the turning when the cord 51 has been partially tautened the arm 56 will lift and then release the weight 54 at each revolution. The spring 105 cushions the engagement and release of the weight 54 during this part of the turning operation.

In case a left last is to be cut from a right model the model is inserted in the swing frame bottom side up, while the block is inserted right side up as is well known and the model and block are rotated in opposite directions. When a left last is to be turned from a right model according to the present invention, the model and block are adjusted as stated, the pin 34 is pulled out and the disk 33 (or 33') is rotated 180 degrees with regard to the sprocket 30 and then locked again to the sprocket by the pin 34. This rotates the cam shaft 180 degrees to correspond with the inverted position of the model. In the turning operation the cams 35 and 36 interchange their relation to the outside and inside of the cone owing to the reversal of direction of rotation of the model, but I have found that a considerable latitude in the adjustments of the cams is permissible without detracting from the accuracy of the cutting and the smoothness of operation so that each of the cams 35 and 36 can be so adjusted as to render unexceptional performance on either the inside or the outside of the cone. If it should be found advisable, the shaft 31 could be easily so constructed as to reverse its direction of rotation with the model.

It will be understood that the variable pressure feature of my invention is not limited to the specific construction shown. It is within the scope of my invention to control continuously the reaction between the model wheel and the swing frame, as could be accomplished by a cam shaped according to the variation in reaction desired.

It will be, of course, understood that the length and width grading mechanisms, which I have not shown, may be used in the well known way in conjunction with my invention.

By means of my invention it is possible to produce a last which shall be in shape, except for the slight irregularities left by the cutting tool, an accurate reproduction of the model, so that no hand shaping is necessary. At most only the smoothing of the helical ridge left by the cutting tool will be required.

Although I have illustrated my invention as embodied in a last lathe and have used the term "last" in the claims, my invention is not to be understood as limited to the last turning art. It embraces broadly the production of irregular objects from models, such as hat blocks, gun stocks, patterns for clothing, etc. By the term "blade" as used in the claims, I mean broadly any description of tool and I have used the term "model wheel" as meaning any contact guide member for the model.

Having described my invention, what I claim as new and desire to secure by Letters Patent of the United States is:—

1. In a last lathe, a model wheel and cutter, constructed and arranged to remove material from the outside of a last block and having its operating cutting edges lying generally parallel to the surface to be produced on the block, both model wheel and cutter having an effective diameter of substantially less than the diameter of a model instep.

2. In a last lathe a cutter carriage comprising a frame, a cutter mounted in the frame and having a substantially straight roughing blade making an acute angle with that end of the axis of the work toward which the cutter moves, said frame being angularly adjustable about a vertical axis to adapt the cutter for working to best advantage upon lasts of different styles.

3. In a last lathe, means for holding and rotating a last block, and a cutter having an integral, roughing and finishing blade arranged to operate on the block over a substantial portion of its length at one time and to rotate on an axis inclined to the axis of the work.

4. In a last lathe, the combination of means for rotating a last block and a cutter having a blade with roughing and finishing portions of substantially different radii of curvature and having its axis of rotation arranged at an acute angle toward and with the direction of feed of the cutter.

5. In a last lathe, the combination of means for rotating a last block with a rotating cutter arranged for traverse relative to the block and comprising a bar mounted at one end on its driving means, having as integral parts thereof a roughing cutting edge on its side, and a finishing cutting edge on its other end, the cutter being mounted to rotate on an axis inclined to that of the block and in the direction of draft of the cutter relative to the block.

6. In a last lathe, means for rotating a last block, a cutter and means for causing a relative traverse between the cutter and the block, the cutter having a head, separate roughing blades mounted at one end on the head and extending approximately parallel to the axis of rotation and at the other ends supporting the finishing portion, whereby the diametral dimensions of the cutter are small as compared with its axial dimensions, so that the cutter is adapted for high speed rotation, the axis of the cutter being inclined toward the axis of rotation of the block, in the direction of the traversing movement of the cutter relative to the block.

7. In a last lathe, a cutter carriage angularly adjustable about an axis perpendicular to the plane passing through the cutter and work, and comprising a cutter having a roughening portion and a substantially hemispherical finishing portion in combination with a substantially spherical model wheel, whereby the angular adjustment will not destroy the form-correspondence between the finishing portion and the model wheel.

8. In a last lathe, a model carriage, a model wheel carriage, a work carriage, a cutter carriage arranged for traverse relatively to the work carriage in a direction parallel to the work axis, a carriage mounted on said cutter carriage for pivotal movement about a vertical axis, a motor and a rotating cutting instrumentality operated thereby mounted on the third carriage, the cutting instrumentality having a spherical finishing portion, whereby the angle between the cutter axis and the work axis may be adjusted without disturbing the correspondence between the model wheel and the finishing portion and without interference with the power supply.

9. In a last lathe, a model carriage, a model wheel carriage, a work carriage, a cutter carriage arranged for traverse relatively to the work carriage in a direction parallel to the work axis, a third carriage mounted on said cutter carriage for sliding movement toward and from the axis of the work, a motor and a rotating cutting instrumentality mounted on the third carriage, whereby the distance between the cutter axis and the work axis may be adjusted without interference with the power supply.

10. In a last lathe, a model carriage and a work carriage, and a model wheel and a cutter carriage arranged for longitudinal traverse relatively to the model and work respectively, the cutter carriage having a support for a cutter shaft which projects therefrom toward the work, and a terminal finishing cutter carried by the cutter shaft, the cutter-shaft support being pivotally adjustable about a vertical pivot and transversely adjustable relatively to the work whereby the angle between the cutter axis and the axis of the work may be adjusted and the finishing cutter brought into correspondence with the model wheel.

11. In a last lathe, a model wheel, a model holding means, and an automatic control for the reaction between said wheel and means.

12. In a last lathe, a model wheel, a model holding means, means for varying the reaction between said wheel and holding means, constructed and arranged to be operative only at predetermined times in the turning of a last.

13. In a last lathe, a model wheel, a model, and means for automatically effecting predetermined variable reaction between said model and said wheel during the turning of a last.

14. In a last lathe, a model wheel, a model, and reaction mechanism for said wheel and model, constructed and arranged to be automatically thrown into and out of operation at predetermined points in the cutting of a last.

15. In a last lathe, a model wheel, a model holder, a rocking member resiliently connected to said holder, and means for stressing said model holder, through said resilient connection, at predetermined times.

16. In a last lathe, a model wheel, a model holder, means for resiliently pressing them together, and means for automatically controlling the force exerted by the resilient means.

17. In a last lathe, a model wheel, a model holder, means for effecting varying reactions between said wheel and a last carried by said holder, during a revolution of said holder, said means comprising a driven member having a predetermined relation to the model holder and constructed and arranged to be detached from its drive and to be reëngaged with its drive without change of said predetermined relation.

18. In a last lathe, a model wheel, a swing frame, and mechanism for intermittently pressing said swing frame toward the model wheel during the cutting of a last.

19. In a last lathe, a model wheel of small diameter, means for pressing the model into contact with said model wheel, said means being constructed and arranged automatically to diminish said pressure intermittently.

20. In a last lathe, a model wheel and a swing frame constructed and arranged to exert a substantially varying pressure upon said model wheel.

21. In a last lathe, a model wheel, a swing frame and means for applying a predeterminedly variable pressure, in addition to the effect of gravity, to said frame toward said model wheel.

22. In a last lathe a model, a model wheel, one of which rotates relatively to the other, and mechanism for modifying the reaction between said wheel and model at similar points in successive revolutions.

23. In a last lathe, a model wheel, a model, reaction mechanism for said wheel and model, and means for predeterminedly varying the action of said mechanism when the wheel is in contact with the model at a certain point in its periphery.

24. In a last lathe, a model wheel, a model holding means, reaction mechanism for said wheel and said means and automatic means for varying the action of said reaction mechanism.

25. In a last lathe, a model wheel, a model, reaction mechanism for said wheel and model, and means for predeterminedly varying the action of said mechanism when the wheel is in contact with a certain portion of the model.

26. In a last lathe, a model wheel, a model, reaction mechanism for said wheel and model, and means for predeterminedly varying the action of said mechanism when the wheel is in contact with the model at a certain point in its length.

27. In a last lathe, a model wheel, means for rotating a model in operative relation to the model wheel, a reaction mechanism for the wheel and rotating means, and means for varying the action of the mechanism in time relation to the operation of the rotating means.

28. In a last lathe, a model wheel, a model holding means, means for relatively traversing the model and the wheel, a reaction mechanism for the wheel and holding means, and means for varying the action of the mechanism in time relation to the operation of the traversing means.

29. In a last lathe, a model wheel, a swing frame and mechanism for resiliently initiating reaction between said wheel and frame during the cutting of a last.

30. In a last lathe, a model wheel, a model holding means, reaction mechanism for said wheel and said holding means and a control for varying the action synchronized with said holding means.

31. In a last lathe, a model wheel, a model, and mechanism for resiliently causing a desired reaction between said model and wheel, said mechanism being constructed and arranged to vary intermittently said reaction.

32. In a last lathe, a swing frame, a model wheel, mechanism for applying a continuous resilient pressure to said swing frame and means for periodically changing said pressure.

33. In a last lathe, a model wheel, a swing frame, a resilient link attached at one end to said swing frame and mechanism constructed and arranged to vary substantially the stress transmitted to the swing frame through said resilient link.

34. In a last lathe, a model wheel, mechanism for increasing the reaction between the model and model wheel as the model wheel is passing over the lateral faces of the cone of the model and for diminishing said reaction as said model wheel approaches the ends of its paths across the lateral faces of the cone.

35. In a last lathe, a swing frame, a model wheel and mechanism comprising a cam shaft for periodically varying the reaction between said model wheel and swing frame.

36. In a last lathe, a model wheel, a model carriage, a model drive, a reaction mechanism for said wheel and carriage, constructed and arranged to govern the pressure exerted between them, and an actuator for said mechanism positively connected with said model drive.

37. In a last lathe, a swing frame, a cam shaft, and resilient reaction means operated by said cam shaft and connected with said swing frame.

38. In a last lathe, a swing frame, a model wheel, mechanism for applying a continuous resilient pressure to said swing frame and means for periodically increasing said pressure, said means having two adjustments corresponding to the two directions of rotation of the model.

39. In a last lathe, a swing frame, a driven cam shaft, resilient reaction means operated by said cam shaft and connected with said swing frame, said cam shaft having an adjustable connection with its drive whereby its position may be made to correspond with that of the model in right and left turning respectively.

40. In a last lathe, a model wheel, a model carriage, a model drive, a mechanism for controlling the magnitude of the reaction between said wheel and carriage, and an actuator for said mechanism positively connectible with said drive in a plurality of positions.

41. In a last lathe, a model wheel, means for creating a substantially constant reaction between the model and model wheel, constructed and arranged to terminate automatically said reaction at a predetermined point in the turning of the last.

42. In a last lathe, a swing frame, means for exerting a substantially constant pressure upon the swing frame during a portion of the turning of the last and means for exerting a substantially variable pressure upon the swing frame during another portion of the turning of the last.

43. In a last lathe, a swing frame, mechanism for applying pressure to said swing frame constructed and arranged to be rendered ineffective during the last cutting operation at a predetermined point.

44. In a last lathe, a swing frame, a moving carriage, a lever arm connected with said swing frame, a weight swinging on said lever arm and means operated by the progression of said carriage for lifting said weight from said lever arm at a predetermined time.

45. In a last lathe, a model wheel, a model carrier and pressure mechanism for governing the reaction between said wheel and said carrier, constructed and arranged to make the variations in the reaction proportionately greater during some portions of the turning than in others.

46. In a last lathe, a model carrier, and automatic mechanism for applying pressure to said carrier constructed and arranged to be effective during only a portion of the turning of the last.

47. In a last lathe, a model wheel, a model carrier, a moving carriage, and a mechanism actuated by the progression of said carriage for varying the reaction between said wheel and carrier.

48. In a last lathe, a model carrier, a lever arm through which pressure may be exerted on said carrier, a weight constructed and arranged to actuate said arm, a flexible means constructed and arranged to lift said weight whereby its influence upon said arm may be terminated, and automatic means for varying the effective length of said flexible means.

49. In a last lathe, model holding means, a model wheel, the diametral dimensions of which do not greatly exceed those of the model, and mechanism for systematically varying the reaction between the model wheel and the model holding means.

50. In a last lathe, model holding means, a model wheel, the diametral dimensions of which do not greatly exceed those of the model, and mechanism for varying the reaction between the model wheel and model holding means at predetermined times in the revolution of the model.

51. In a last lathe, model holding means, a model wheel, the diametral dimensions of which do not greatly exceed those of the model, and mechanism constructed and arranged to increase the reaction between the wheel and holding means when the model wheel is rolling down toward the axis of rotation of the model, and to decrease the reaction when the model wheel is rolling up away from the axis of rotation.

52. In a last lathe, model holding means, a model wheel, the diametral dimensions of which do not greatly exceed those of the model, and mechanism operating in time relation to the relative movement of the wheel and model-holding means for governing the reaction between them.

53. In a last lathe, model holding means, a model wheel the diametral dimensions of which are comparable with those of the model, and mechanism arranged in time relation to the relative movement of the holding means and the model wheel for varying the reaction between them, whereby the low portions of the model are brought down to the model wheel, and the high portions may roll over it without locking.

54. In a last lathe, a model wheel the diametral dimensions of which are comparable with those of the model, mechanism constructed and arranged to assist the rolling of the model wheel respectively into and out of the hollow portions of the model and means for substantially increasing the average pressure between the model wheel and the model during the cutting of the toe part of the last.

55. In a last lathe, a model carrier, a lever arm positively connected with said carrier, a flexible suspension, a weight on said suspension, resiliently engaging said arm when permitted by said suspension, and means for automatically varying the length of said suspension.

In testimony whereof I have signed my name to this specification.

LELAND B. WHIPPLE.

It is hereby certified that in Letters Patent No. 1,293,276, granted February 4, 1919, upon the application of Leland B. Whipple, of Rochester, New York, for an improvement in "Last-Lathes," an error appears in the printed specification requiring correction as follows: Page 6, line 11, claim 7, for the word "roughening" read *roughing;* and that the said Letters Patent should be read with this correction therein that the same may conform to the record of the case in the Patent Office.

Signed and sealed this 2d day of December, A. D., 1919.

[SEAL.]

Cl. 142—15.

M. H. COULSTON,
*Acting Commissioner of Patents.*